April 22, 1969
J. G. E. COHN ET AL
3,440,103
FUEL CELL AND CATHODE INCLUDING PLATINUM ALLOY
WITH COBALT OR NIOBIUM
Filed July 13, 1964
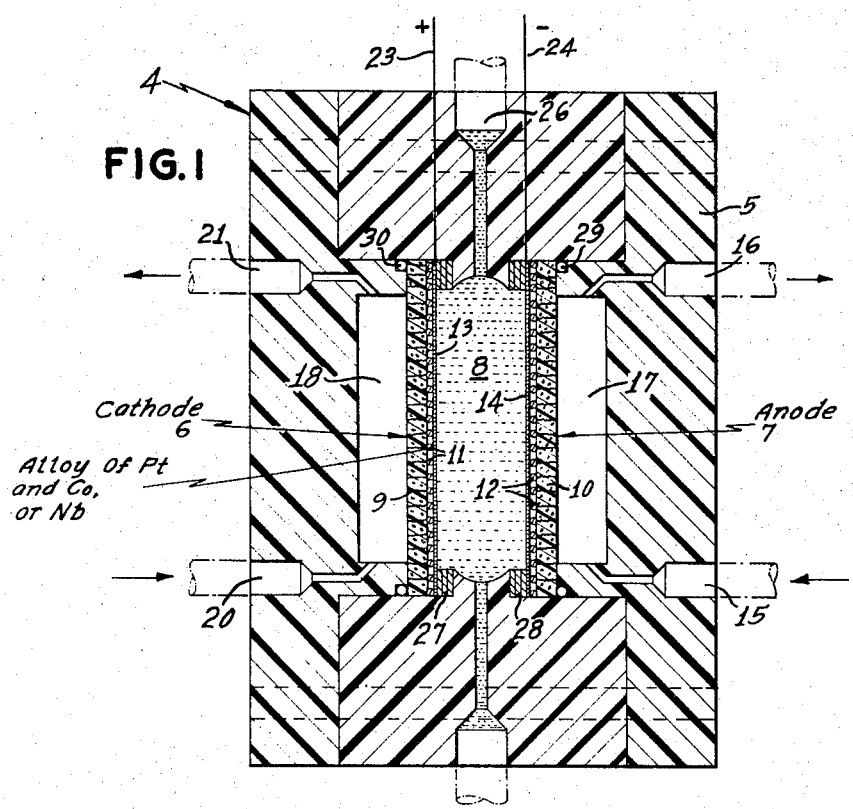
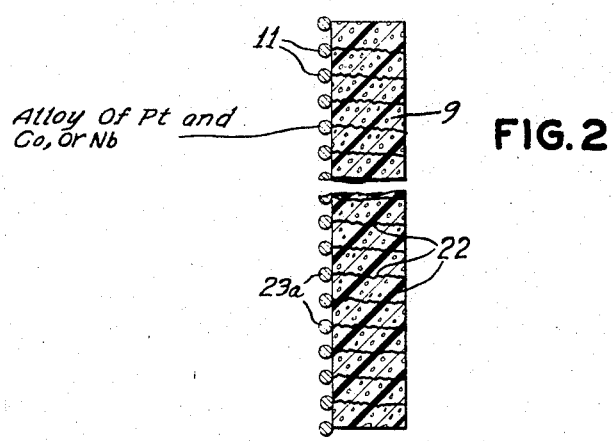
INVENTORS
Johann G. E. Cohn
Otto J. Adlhart
Keith O. Heyer
ATTORNEY

United States Patent Office 3,440,103
Patented Apr. 22, 1969

3,440,103
FUEL CELL AND CATHODE INCLUDING PLATINUM ALLOY WITH COBALT OR NIOBIUM
Johann G. E. Cohn, Orange, Otto J. Adlhart, Newark, and Keith O. Hever, Bloomfield, N.J., assignors to Engelhard Industries, Inc., Newark, N.J., a corporation of Delaware
Filed July 13, 1964, Ser. No. 382,080
Int. Cl. H01m 27/06
U.S. Cl. 136—86                 5 Claims

ABSTRACT OF THE DISCLOSURE

This disclosure pertains to use of fuel cells having catalytic cathodes. The catalysts assist in efficiently producing electrical energy with minimum polarization losses.

---

This invention relates to fuel cells and more especially to fuel cells equipped with new and improved oxidizer electrodes, the oxidizer electrode per se, and the production of electrical energy utilizing such fuel cells.

Fuel cells are well known as devices for the direct conversion of the chemical energy of a fuel into electrical energy. The cells basically are composed of an oxidizer electrode or cathode, a fuel electrode or anode, and an electrolyte. The terms "oxidizer electrode" and "cathode" are used interchangeably herein as are the terms "fuel electrode" and "anode."

When operating a fuel cell employing, for instance, a gaseous organic fuel and an acid electrolyte, the gaseous fuel is passed into the interior of a porous gas diffusion anode to the interface formed by the anode and the electrolyte. A catalyst also present at such interface or juncture promotes the electrochemical reaction of the fuel at the anode with the release of electrons to the anode surface, which electrons are drained off through an external circuit. An oxidizing gas, e.g., oxygen, is passed into the interior of a porous gas diffusion cathode to the interface formed by the cathode and electrolyte. A catalyst is also present at such interface or juncture and promotes the electrochemical ionization of the oxygen by reaction with the electrons supplied from the external circuit. The negatively charged ions formed at the cathode neutralize the positively charged particles formed at the anode, the fuel being oxidized at the anode to form carbon dioxide and/or water.

Platinum has been utilized heretofore as cathode catalyst for catalyzing the electrochemical conversion of oxygen in fuel cells using acid electrolyte. We have tried platinum as catalyst at the cathode and while platinum has given satisfactory results as such catalyst, nevertheless there was room for improvement from the standpoint of obtaining higher cathode voltages. Further, platinum is one of the most expensive of the precious metals and to provide the art with a cathode catalyst achieving superior results as compared to the platinum and which is appreciably less expensive than the platinum would be particularly of merit.

In accordance with the present invention, we have found that cathode potentials are attained during cell operation which are superior to those provided by cell cathodes having a platinum per se as catalyst and with a material as cathode catalyst which is appreciably less expensive than the platinum per se. The new and improved catalytic cathode of this invention comprises as catalyst an alloy of platinum and either cobalt or niobium as the other alloying constituent. By reason of the superior cathode potentials provided by this invention, there is achieved an improved performance of the fuel cell with an increased cell efficiency and materially higher power output.

The cathode catalyst of this invention can be either unsupported or supported on a suitable substrate. When unsupported, it can be in the form of a porous self-sustaining disc or sheet or of another desired shape formed by compacting a mass of the alloy particles in a die with application of pressure. Thereafter the compact is preferably sintered to impart strength thereto. When supported, the alloy can be applied and adhered to the surface of porous metallic structures such as, for instance, porous metallic sheets or grids or porous non-metallic structures such as, for instance, porous discs or sheets of carbon, graphite or plastics. The supported cathode catalyst can also be prepared by mixing together the catalyst and carrier or support in the form of powders, followed by compacting in a die by application of pressure, and preferably then sintering the compact.

The anode is preferably also a catalytic anode. Exemplary of the catalyst for the anode is platinum, and an alloy of platinum with ruthenium, osmium or rhodium, preferably the alloy. The catalytic anode can also be a self-sustaining unsupported anode or a supported catalytic anode, with either type prepared in similar manner as the unsupported or supported catalytic cathode.

The process for production of electrical energy in accordance with this invention comprises, in its broader aspects, contacting a catalytic cathode of the fuel cell with an oxidizer with the cathode catalyst comprising an alloy of platinum and either cobalt or niobium, and contacting the anode of the cell with a fuel. The anode and cathode are each in contact with an electrolyte. Consequently the fuel reacts electrochemically at the anode with release of electrons which are carried off by an electronically conductive member of an external circuit, and the oxidizer reacts electrochemically at the cathode with the electrons supplied from the external circuit, so that a continuous electric current results.

The oxidizer, for instance an oxidizing gas, can be contacted with the electrolyte and catalyst by passage within a gas-pervious cathode of this invention.

The fuel, for instance a normally gaseous hydrocarbon or hydrogen, can be contacted in gaseous or vapor phase with the electrolyte by passage within a gas-pervious anode. Alternatively the fuel can be dissolved in the electrolyte, for example methanol dissolved in sulfuric acid electrolyte, wherein it contacts the anode.

The platinum-cobalt or platinum-niobium alloys of this invention can be prepared by melting such two metals in proportions corresponding to that desired in the product alloy together with a third component, capable of being readily leached out of the resulting alloy, for instance aluminum or silicon. The melting of the three components can be done in a gas-fired or electrical furnace. The resulting alloy, after removal from the furnace and cooling solidification, is treated with caustic, for instance by immersion in potassium hydroxide or sodium hydroxide or sodium hydroxide aqueous solution of, for instance, 10% caustic concentration, to dissolve out the aluminum or silicon. If desired the leaching can be effected by treatment with acid. The resulting binary or substantially binary alloy is obtained as a powder. In this preparation method the aluminum or silicon is usually present in major amount, with the platinum and the cobalt or niobium present in minor amounts. Thus a typical alloy prior to the leaching contains by weight 85% aluminum or silicon and 15% total platinum and either cobalt or niobium.

In a specific embodiment for preparing the supported alloy catalysts, the platinum-cobalt or platinum-niobium alloy prepared by the method hereinbefore disclosed is applied and adhered in powder form to the support. With a support such as a sheet of porous "Teflon," the alloy powder particles are pressed into the surface of the "Teflon" at normal temperature by means of a suitable press, for instance a hydraulic press, thereby to adhere to the support.

The fuel herein is hydrogen or a normally gaseous, liquid or solid hydrocarbon, including acyclic and cyclic aliphatic hydrocarbons. Exemplary of the hydrocarbon fuels are a straight chain alkane hydrocarbon having from 1–20 carbon atoms inclusive per molecule, e.g., methane, butane, pentane, propane, ethane, octane, nonane, decane and so forth; cyclobutane, cyclopropane, cyclopentane, cyclohexane; and sugar.

The platinum-niobium alloys of this invention preferably contain, by weight, from about 5%–30% of niobium and the balance platinum; and the platinum-cobalt alloys preferably contain, by weight, from about 5%–30% of cobalt and the balance platinum.

With organic fuels the electrolyte utilized is one containing no free base or substantially devoid of free base. The preferred electrolyte with organic fuels is preferably an acid electrolyte, for instance an aqueous sulfuric acid solution, e.g., aqueous sulfuric acid solution of 5% to 80% by weight concentration, or aqueous phosphoric acid or hydrochloric acid of similar concentration.

The fuel cells of this invention may be operated at ambient conditions but preferably are operated at elevated temperatures in the range of about 50° C.–300° C. Sufficient heat for operation of the cells is usually provided by some polarization unavoidably occurring therein. Heat can be supplied from an outside source for start-up and, if necessary, during the course of the cell operation, for instance by steam supplied to a suitable steam jacket. The temperature of the cell may be controlled, for instance, by circulation of cooling air or other cooling gas about the cell, or by use of a predetermined amount of thermal insulation material about the cell.

Reference is now made to the accompanying drawings wherein:

FIGURE 1 is a schematic longitudinal sectional view of a fuel cell of this invention; and FIGURE 2 is an enlarged schematic sectional view of a fuel electrode of this invention.

Referring to FIGURE 1, fuel cell 4 comprises container 5 of "Teflon" or other material of low electrical conductivity, porous electrodes 6 and 7 of opposing polarity therein and respectively the cathode and anode and liquid electrolyte 8 contacting opposed surfaces of electrode 6 and 7. Cathode and anode 6 and 7 respectively are each made up of a porous non-catalytic substrate or support 9 and 10 of low electrical conductivity, for instance a sheet of porous "Teflon" sponge. Cathode 6 is gas pervious and has permeable catalyst layer 11 of an alloy of this invention of platinum and cobalt adhered to the support, and gas pervious anode 7 also has a permeable catalyst layer 12 of an alloy containing, by weight, 95% platinum and 5% ruthenium adhered to the support. In addition to the catalyst being adhered to the exterior surface of supports 9 and 10 of electrodes 6 and 7, some of the catalyst is on the walls defining accessible pores of the porous supports 9 and 10. A three phase contacting of catalyst, electrolyte and gaseous fuel results in the pores of substrate 10 of anode 7, where the catalyst contacts the interface or juncture of the electrolyte and gaseous fuel. Electrically conductive members 13 and 14, for instance single ply platinum gauze sheets, are in face to face contact with catalyst layers 11 and 12 on supports 9 and 10 respectively. The connection to the conventional reference electrode (not shown) is designated at 26. Annular members 27 and 28 of gold and O-rings 29 and 30 of neoprene rubber serve to respectively maintain the gauze sheets 13 and 14 in contact with the catalyst layers and to seal the assembly. When a self-sustaining, unsupported porous shape of catalytic metal, for instance the self-sustaining porous plate or sheet of catalytic metal is employed as cathode and/or anode, the electrically conductive members 13 and/or 14 may be dispensed with. In this event a suitable electrically conductive member, for instance a conductive lead wire or strip, of the external circuit need contact only a portion of each of the conductive cathode and/or anode and usually an end portion thereof.

Fuel inlet and outlet 15 and 16 respectively enable respectively continuous supply of the fuel in gaseous form into anode compartment 17 and the outflow of gaseous reaction products from such compartment. The gaseous fuel, for instance methanol, diffuses into the interior of porous gas diffusion anode 7 to the interface formed by the anode and the electrolyte. The catalyst also present at such interface or juncture promotes the release of electrons to the anode surface and such electrodes are withdrawn through an external circuit.

An oxidizing gas, for instance, oxygen per se, is continuously supplied into cathode compartment 18 through inlet 20 and the cathode effluent evolves through outlet 21. The oxygen gas diffuses into the interior of porous gas diffusion cathode 6 to the interface formed by the cathode and electrolyte. The alloy catalyst of this invention present at such interface or juncture within the pores promotes the electrochemical ionization of the oxygen, and the negatively charged ions formed at the cathode neutralize the positively charged particles formed at the anode. Exemplary of other oxidizers utilizable herein in place of oxygen per se is air.

One cathode of this invention is shown in more detail in FIGURE 2. Pores 22 of porous support sheet 9 of low electrical conductivity, for instance, of porous "Teflon," communicate opposite sides of the support. The alloy catalyst of this invention is supported on substrate 9 as a permeable layer 11 of powder particles 23a with the catalyst particles also on the walls defining the accessible pores in the interior of the porous support 9, as previously disclosed herein. An electrically conductive member such as the platinum gauze sheet 13 shown in FIGURE 1 will be secured in face to face contact with catalyst layer 11 for purpose of supplying the electrons to the cathode for the electrochemical reduction.

Electrically conductive lead wires 23 and 24 are connected to the upper portion of the platinum gauze current collectors 13 and 14 respectively. Lead wires 23 and 24 are connected in an external circuit with a suitable resistance, for instance, an incandescent lamp (not shown), and the flow of electrons resulting from the electrochemical reaction within the fuel cell results in the lamp being energized and lighting up.

The invention is further illustrated by reference to the following example. A number of different materials were tested and evaluated as cathode catalyst by a half cell evaluation procedure. Such a half cell evaluation procedure is described in J. Electrochem. Soc., 109, 553 (1962).

A number of platinum-containing binary alloys were prepared by a procedure involving preparing a melt containing, by weight, 85% of aluminum and 15% total of platinum and another metal as alloying constituent. After solidification of the melt, the aluminum was removed by immersing the solid in 20% aqueous sodium hydroxide at 80° C. The alloys were thus obtained in the form of a powder.

The half cell used for testing the alloys as well as non-alloyed single metal as cathode catalyst was operatively connected to an anode of platinum screen. The powder of each alloy was adhered to a porous "Teflon" sheet by pressing with a hydraulic press to form the cathode to be tested. The electrolyte was 2 N $H_2SO_4$ and the feed to the porous gas diffusion cathode was pure oxygen. The cell was operated at a temperature of 85° C. and atmospheric pressure. The following results were obtained:

TABLE

| Test run | Catalyst composition, weight percent | Potential in volts vs. STHE at indicated current density in ma./cm.² | | | |
|---|---|---|---|---|---|
| | | 0 | 5 | 20 | 50 |
| 1 | Pt black per se | 1.065 | .960 | .940 | .875 |
| 2 | Alloy of Pt 80-Co 20 | 1.070 | 1.020 | .970 | .890 |
| 3 | Alloy of Pt 80-Nb 20 | 1.090 | 1.040 | .985 | .925 |

The superiority of the alloys Pt and Co, and Pt and Nb of Runs 2 and 3 respectively over the Pt black alone of Run 1 is shown by the table.

A physical mixture of finely divided platinum and cobalt on the other hand was unsatisfactory as cathode catalyst due to the titanium and cobalt dissolving in the acid electrolyte. Such dissolution does not occur with the Pt-Co alloy of this invention which is believed due to the more intimate association or relationship of the alloyed constituents than when the metals are merely mechanically mixed together in finely divided form.

What is claimed is:

1. A process for the production of electrical energy, which comprises contacting a catalytic cathode of a fuel cell with an oxygen-containing gas, the catalyst being an alloy of about 20 weight percent of a material selected from the group consisting of cobalt and niobium and the remainder platinum, the cathode being in contact with an acid electrolyte, and contacting an anode of the cell with a fuel, the anode also being in contact with the electrolyte.

2. The process of claim 1 wherein the cathode catalyst is an alloy of platinum and cobalt.

3. The process of claim 1 wherein the cathode catalyst is an alloy of platinum and niobium.

4. A fuel cell comprising a catalytic cathode, an anode, and an electrolyte contacting a surface of the anode and cathode, the cathode catalyst being an alloy of about 20 weight percent of a material selected from the group consisting of cobalt and niobium, and the remainder platinum, means for supplying an oxidizer to the cathode, and means for supplying a fuel to the anode.

5. A fuel cell cathode comprising a supporting substrate and on the substrate as catalyst an alloy consisting of about 20 weight percent niobium and the remainder platinum.

References Cited

UNITED STATES PATENTS

| 3,203,834 | 8/1965 | Breiner | 136—86 |
| 3,206,337 | 9/1965 | Walmer | 75—172 X |
| 3,235,473 | 2/1966 | Le Duc | 136—86 X |
| 3,262,816 | 7/1966 | Lindholm | 136—86 |
| 3,274,031 | 9/1966 | Maget et al. | 136—120 |
| 3,276,909 | 10/1966 | Moos | 136—86 |
| 2,018,760 | 10/1935 | Hickey | 252—472 |
| 2,384,501 | 9/1945 | Streicher | 252—472 X |
| 3,291,753 | 12/1966 | Thompson | 136—86 X |
| 3,306,780 | 2/1967 | Dieberg | 136—86 X |

ALLEN B. CURTIS, *Primary Examiner.*

U.S. Cl. X.R.

136—120